United States Patent
Becker

(10) Patent No.: US 7,634,948 B2
(45) Date of Patent: Dec. 22, 2009

(54) PROCESS AND DEVICE FOR DYNAMIC MEASUREMENT OF THE AXIAL DEFORMATION OF A ROTATING HOLLOW SHAFT

(75) Inventor: Edwin Becker, Reken (DE)

(73) Assignee: Prueftechnik Dieter Busch AG, Ismaning (DE)

( * ) Notice: Subject to any disclaimer, the term of this patent is extended or adjusted under 35 U.S.C. 154(b) by 0 days.

(21) Appl. No.: 11/958,089

(22) Filed: Dec. 17, 2007

(65) Prior Publication Data

US 2008/0158562 A1 Jul. 3, 2008

(30) Foreign Application Priority Data

Dec. 15, 2006 (DE) ................. 10 2006 059 439

(51) Int. Cl.
*G01L 1/24* (2006.01)
*G01L 5/12* (2006.01)

(52) U.S. Cl. ................. 73/800; 73/862.49; 356/73.1
(58) Field of Classification Search ................ 73/800, 73/862.49; 356/73.1
See application file for complete search history.

(56) References Cited

U.S. PATENT DOCUMENTS

| | | | |
|---|---|---|---|
| 4,142,408 | A | 3/1979 | Riazuelo |
| 4,196,629 | A * | 4/1980 | Philips ................. 73/593 |
| 4,246,780 | A | 1/1981 | Reed |
| 6,023,325 | A * | 2/2000 | Sahlgren et al. ............ 356/73.1 |
| 6,289,749 | B1 | 9/2001 | Sanders |
| 6,784,983 | B1 * | 8/2004 | Bjerkan et al. ............. 356/73.1 |
| 6,920,801 | B2 | 7/2005 | Van Leeuwen et al. |
| 7,086,834 | B2 * | 8/2006 | LeMieux ................. 416/1 |

(Continued)

FOREIGN PATENT DOCUMENTS

DE   40 37 077 A1   5/1992

(Continued)

OTHER PUBLICATIONS

Pivano, L.; Smogeli, N.; Johansen, T.A.; Fossen, T.I., "Marine Propeller Thrust Estimation in Four-Quadrant Operations," Decision and Control, 2006 45th IEEE Conference on, pp. 1333-1338, Dec. 13-15, 2006.*

(Continued)

*Primary Examiner*—Lisa M Caputo
*Assistant Examiner*—Punam Patel
(74) *Attorney, Agent, or Firm*—David S. Safran; Roberts Mlotkowski; Safran & Cole, P.C.

(57) ABSTRACT

A process and device for dynamic measurement of the axial deformation of a rotating hollow shaft (10), a glass fiber segment (16) of a fiber optic sensor (18) being attached securely to a section of the inside wall of the hollow shaft (10) extending in axial alignment with the shaft. A light signal produced by a light source (24) is injected into the glass fiber segment (16), and the light signal being detected by a detector (28) after passing through the glass fiber segment (16). Axial deformation of the section of the inside wall of the hollow shaft (10) is ascertained by determining axial deformation of the glass fiber segment (16) from the change of at least one parameter of the light signal that occurs when the light signal passes through the glass fiber segment (16).

13 Claims, 1 Drawing Sheet

U.S. PATENT DOCUMENTS

2005/0253051 A1 11/2005 Hwang et al.
2006/0115335 A1* 6/2006 Allen et al. ............... 405/274

FOREIGN PATENT DOCUMENTS

| DE | 196 09 320 A1 | 9/1997 |
| DE | 199 13 800 A1 | 10/2000 |
| DE | 201 11 539 U1 | 1/2002 |
| DE | 102 38 991 A1 | 3/2004 |
| DE | 10 2004 046 860 A1 | 4/2006 |
| DE | 10 2005 047 738 A1 | 4/2007 |
| EP | 0 404 242 A1 | 12/1990 |
| EP | 0 984 243 A1 | 3/2000 |
| EP | 1 014 064 A2 | 6/2000 |
| EP | 1 189 015 A1 | 3/2002 |
| GB | 2 113 845 A | 8/1983 |

OTHER PUBLICATIONS

"Run Silent, Run Deep." Federation of American Scientists. Dec. 8, 1998. Accessed Online Aug. 8, 2009. <http://www.fas.org/man/dod-101/sys/ship/deep.htm>.*

German Patent Office Office Action for German Application No. 10 2006 059 439.8.

* cited by examiner

PROCESS AND DEVICE FOR DYNAMIC MEASUREMENT OF THE AXIAL DEFORMATION OF A ROTATING HOLLOW SHAFT

BACKGROUND OF THE INVENTION

This invention relates to a process and a device for dynamic measurement of the axial deformation of a rotating hollow shaft.

DESCRIPTION OF RELATED ART

The measurement of the thrust acting on a drive shaft, i.e., the forces acting in the axial direction on the shaft, is especially of interest in ship propulsion systems, in order especially to monitor the propeller. Conventionally, the forces on the thrust bearing of the shaft are measured. Thus, for example, in UK Patent Application GB 2 113 845 A, the use of fiber optic strain sensors for thrust measurement on the shaft bearing is described. Similarly U.S. Pat. No. 6,920,801 describes use of optical sensors for measurement of axial forces by means of a sensor ring on the shaft bearing. Also, European Patent Application EP 1 007 925 B1 and corresponding U.S. Pat. No. 6,289,749 mention use of fiber optic sensors for thrust measurement on the shaft bearing.

German Patent Application DE 196 09 320 A1 suggests, in general, the detection of the change in the length of a shaft by means of optical processes.

In European Patent Application EP 1 189 015 A1, the axial deformation of a shaft is detected using the optical scanning of markings applied to the outside of the shaft.

U.S. Pat. No. 4,246,780 describes direct thrust measurement by means of strain sensors attached to a shaft with a belt having a telemetric tap.

SUMMARY OF THE INVENTION

A primary object of this invention is to devise a process for dynamic measurement of the axial deformation of a rotating hollow shaft, so that the axial deformation is easily detected as accurately and reliably as possible.

This object and others are achieved by a process and device in accordance with the invention as described in detail below.

In the approach in accordance with the invention, it is advantageous that, because a glass fiber segment of a fiber optic sensor is attached securely to the inside wall of the hollow shaft in an axial alignment, the axial deformation of this segment of the hollow shaft can be reliably detected, measurement taking place directly on the shaft; this delivers much more reliable data than a measurement, for example, on the thrust bearing of the shaft. In particular, by means of the fiber optic sensor, the axial deformation of a longer segment of the hollow shaft can be directly determined while, for example, with wire strain gauges only spot measurements are possible; this would lead to a complicated structure with a host of individual wire strain gauges to be connected in the measurement of a longer shaft segment.

Preferred embodiments of the invention are explained in detail below with reference to the accompanying drawings.

DETAILED DESCRIPTION OF THE INVENTION

Figure 1:
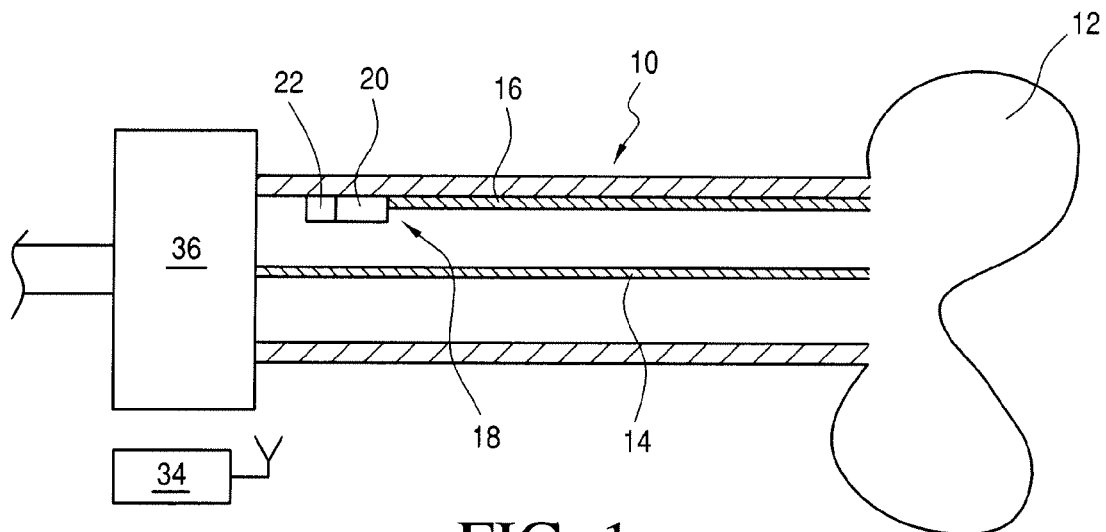
FIG. 1 is a schematic lengthwise section through a rotatable hollow shaft of a ship propulsion system which is provided with a fiber optic sensor for executing a process in accordance with the invention for dynamic measurement of the axial deformation of the shaft.
Figure 2:
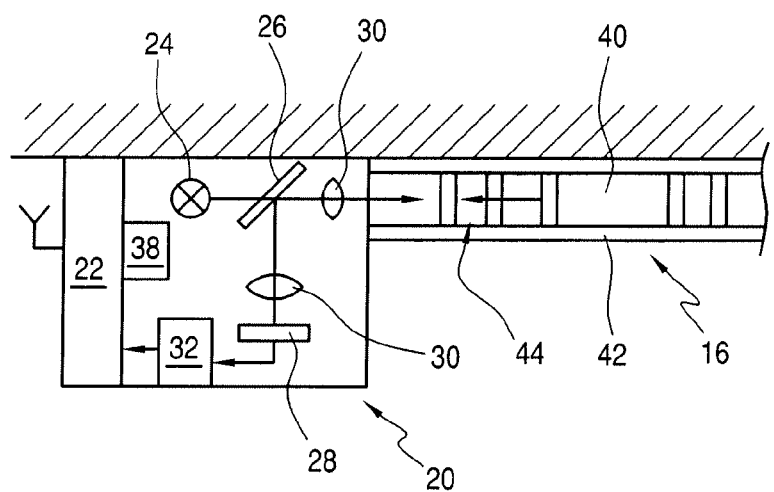
FIG. 2 is an enlarged representation of the fiber optic sensor of FIG. 1.

FIG. 1 shows a hollow shaft 10 of a marine power plant which bears a variable pitch propeller 12 on one end and its other end is connected by means of an elastic coupling 36 to the ship's engine (not shown). The elastic coupling 36 is used to equalize rpm fluctuations of the ship's engine. The shaft 10 is made as a hollow shaft, and an arrangement of one or more rods 14 for adjustment of the propeller 12 run within the hollow shaft 10.

On the inside wall of the hollow shaft 10, a glass fiber segment 16 of a fiber optic sensor 18 is securely attached extending in the axial direction, for example, by cementing. In addition to the glass fiber segment 16, the fiber optic sensor 18 comprises a measurement unit 20 and a telemetry unit 22. The measurement unit 20 has a light source 24 which is, for example, a laser diode, a beam splitter 26, a detector 28 and lenses 30 in order, on the one hand, to inject a light signal produced by the light source 24 into the glass fiber segment 16, and on the other hand, to detect the light signal after passing through the glass fiber segment 16 with a detector 28, from the change of at least one parameter of the light signal, when the light signal passes through the glass fiber segment 16, the axial deformation, i.e., elongation or compression, of the glass fiber segment 16 being determined. Since the glass fiber segment 16 is connected securely to the inside wall of the hollow shaft 10, conclusions can be drawn therefrom regarding the axial deformation of the hollow shaft 10. The measurement unit 20, moreover, has a power source 38.

In the illustrated example, the light signal reflected in the glass fiber segment 16 is detected by the detector 28. The corresponding measurement signals which are output by the detector 28 are amplified in a unit 32 and filtered, and then, travel to the telemetry unit 22, by means of which they are transmitted wirelessly to an evaluation unit 34 which is arranged separately from the hollow shaft 10.

The glass fiber segment 16 extends preferably essentially over the entire rigid segment of the hollow shaft 10 which extends from the elastic coupling 36 to the propeller 12. In this way, the total deformation of the shaft 10 in the axial direction, and thus, the thrust acting on the shaft 10 can be determined. In turn, conclusions regarding the instantaneous state of the propeller 12 can be drawn from these data. Thus, for example, it can be ascertained in this way whether cavitation is being produced by the propeller 12 at that instant.

The measurement unit 20 and the telemetry unit 22 are attached securely to the inside wall of the hollow shaft 10. Typically, the glass fiber segment 16 is not attached directly to the inside wall of the hollow shaft 10 with the fiber 40 itself, but rather is attached by means of a protective tube 42 which surrounds the fiber 40 and which is typically made of sheet metal.

Fundamentally, the evaluated parameters of the light signal could also be the intensity, phase, wavelength, polarization or pulse propagation time.

Preferably, the fiber optic sensor 18 is, however, made as a Bragg grating sensor, the glass fiber segment 16 being provided with at least one, but preferably with numerous Bragg gratings 44. The Bragg gratings are produced by the core of the glass fiber 40 being illuminated with a three-dimensionally varying pattern of intensive UV laser light, the photons of this light partially breaking the silicon-oxygen bonds, by which the structure of the fibers is disrupted and the index of refraction is locally slightly increased. In this way, a periodic variation of the index of refraction of the fiber which corresponds to the pattern is produced. The three-dimensionally varying pattern, in turn, can be produced, for example, by interference of two coherent beams or a suitable mask.

A fiber modified in this way is used as a wavelength-selective mirror: A light signal injected into the fiber is partially reflected at each of the changes in the index of refraction, these reflections interfering destructively at most wavelengths and the light signal propagating essentially undisturbed in the fiber. However, in a narrow wavelength range, constructive interference takes place, and the light is reflected in the fiber. The maximum reflectivity takes place at the so-called Bragg wavelength $\lambda_B$ which arises from the product of the grating period d and twice the effective index of refraction.

Figure 3A:
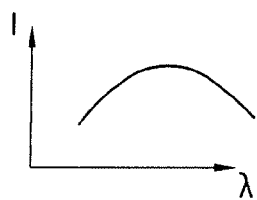
FIG. 3a is a graph showing an example of the spectral distribution of a light pulse injected into the glass fiber of the sensor.
Figure 3B:
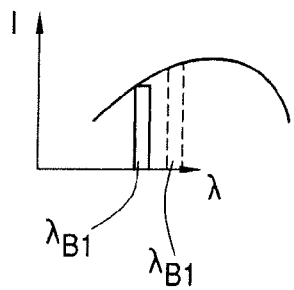
FIG. 3b is a graph showing the spectral distribution of the pulse reflected in the glass fiber.

Consequently, a broadband light signal which has been injected into the fiber (see, FIG. 3a) is reflected by the glass fiber as a narrowband signal with essentially the Bragg wavelength $\lambda_{B1}$ (see, FIG. 3b). Since the Bragg wavelength depends on the three-dimensional period of the grating 42 elongation or compression of the glass fiber 40 which is caused by a corresponding axial elongation or compression of the shaft 10 leads to a corresponding change of the grating period d, by which the Bragg wavelength also changes accordingly, for example, to a value $\lambda_{B2}$ (see FIG. 3b). Therefore, the elongation or compression of the shaft 10 in the axial direction can be detected by spectral analysis of the reflected signal.

Simultaneous measurement in different regions along the shaft 10 can take place by a plurality of Bragg gratings 44 being provided which differ by their grating period, and thus, their Bragg wavelength. Then, a frequency multiplexing process can be used for reading out the sensor.

A fiber Bragg grating (FBG) is an optical sensor recorded within the core of a standard, single-mode optical fiber using spatially-varying pattern of intense UV laser light. Short-wavelength UV photons have sufficient energy to break the highly stable silicon-oxygen bonds, damaging the structure of the fiber and increasing its refractive index slightly. A periodic spatial variation in the intensity of UV light, caused by the interference of two coherent beams or a mask placed over the fiber, gives rise to a corresponding periodic variation in the refractive index of the fiber. The grating formed at this modified region of fiber becomes as a wavelength selective mirror: light travelling down the fiber is partially reflected at each of the tiny index variations, but these reflections interfere destructively at most wavelengths and the light continues to propagate down the fiber uninterrupted. However, at one particular narrow range of wavelengths, constructive interference occurs and light is returned down the fiber.

Maximum reflectivity occurs at the so-called Bragg wavelength $\lambda_B$, given by:

$$\lambda_B = 2n_{eff}\Lambda \quad (1)$$

where $n_{eff}$ is the effective refractive index of the mode propagating in the fiber and $\Lambda$ is the FBG period. Equation (1) implies that the reflected wavelength $\lambda_B$ is affected by any variation in the physical or mechanical properties of the grating region. For example, strain on the fiber alters $\Lambda$ and $n_{eff}$ via the stress-optic effect. Similarly, changes in temperature lead to changes in $n_{eff}$ via the thermo-optic effect and in an unconstrained fiber, $\Lambda$ is influenced by thermal expansion or contraction. This situation is expressed in Equation 2, where the first term on the RHS gives the effect of strain on $\lambda_B$ and the second describes the effect of temperature.

$$\Delta\lambda_B = \lambda_B(1-\rho_\alpha)\Delta\epsilon + \lambda_B(\alpha+\xi)\Delta T \quad (2)$$

where $\Delta\lambda_B$ is the change in Bragg wavelength, $\rho_\alpha$, $\alpha$ and $\xi$ are respectively the photoelastic, thermal expansion and thermo-optic coefficients of the fiber, $\Delta\epsilon$ is the change of strain and $\Delta T$ is the temperature change. For a typical grating written in a silica fiber and with $\lambda_B \approx 1550$ nm, sensitivities to strain and temperature are approximately 1.2 pm/$\mu\epsilon$ and 10 pm/° C. respectively. Importantly, the two terms of equation (2) are independent, meaning that the FBG can be used to make temperature measurements by isolating the fiber from strain, and temperature compensated strain measurements can be made with knowledge of the temperature, often conveniently derived from a second, strain-isolated FBG. As well as strain and temperature measurement, FBGs can be used for other measurands, such as pressure, acceleration, displacement and the like by building the FBG into a transducer. These FBG sensors and transducers, as well as the instrumentation required to illuminate the fiber and interrogate the Bragg reflections.

These and other fiber optic sensors can be used both for detection of quasistatic axial deformation and also for detection of deformations which are excited with higher frequency. Here, quasistatic deformations are deformations which are present in continuous operation under operating conditions which remain the same. Compared to the non-rotating shaft at rest, in continuous operation, the shaft is compressed in the axial direction by the transfer of power from the engine to the propeller. This compression can be measured by means of a fiber optic sensor. The thrust actually applied can then be deduced therefrom. The deformations excited with higher frequency can be, for example, vibrations of the marine diesel engine transmitted to the shaft with a few hertz, but also numerous other vibrations such as, for example, bearing noise. Even the frequencies of cavitation noise are available to modern fiber optic sensors.

It goes without saying that the marine shafts described in this specification are only one example of the hollow shafts provided in accordance with the invention with a fiber optic sensor. In wind power generators for example, hollow shafts of similar construction are used in which fiber optic sensors can be used accordingly. Hollow shafts used in aircraft can also be provided with a fiber optic sensor in the manner in accordance with the invention.

What is claimed is:

1. Process for dynamic measurement of the axial deformation of a rotating hollow shaft comprising the steps of:
    rotating a hollow shaft having a glass fiber segment of a fiber optic sensor securely attached to a section of the inside wall of the hollow shaft so as to extend in axial alignment with the hollow shaft,
    injecting a light signal produced by a light source into the glass fiber segment while the hollow shaft is rotating,
    detecting the light signal after it passes through the glass fiber segment by a detector, and
    ascertaining axial deformation of the segment of the inside wall of the hollow shaft due rotation thereof by determining axial deformation of the glass fiber segment over a given period of time from a change of at least one parameter of the light signal when the light signal passes through the glass fiber segment;

wherein the time behavior of the ascertained axial deformation is evaluated to detect vibrations of at least one of marine engine and cavitation noise transmitted into the shaft.

2. Process in accordance with claim 1, wherein the glass fiber segment is cemented to the inside wall of the hollow shaft.

3. Process in accordance with claim 1, wherein the glass fiber segment extends essentially over the entire length of a rigid part of the hollow shaft.

4. Process in accordance with claim 1, wherein the light source and the detector are attached securely to the hollow shaft.

5. Process in accordance with claim 4, wherein a power supply for the light source and the detector is attached securely to the hollow shaft.

6. Process in accordance with claim 1, wherein an evaluation unit is provided which is separate from the hollow shaft, a detector signal being transmitted wirelessly to the evaluation unit by means of a telemetry arrangement.

7. Process in accordance with claim 1, wherein the light signal is reflected in the glass fiber segment before it is detected by the detector.

8. Process in accordance with claim 1, wherein said at least one parameter is at least one of the intensity, phase, wavelength, polarization, and pulse propagation time of the light signal.

9. Process in accordance with claim 1, wherein the fiber optic sensor is a fiber Bragg grating sensor, the glass fiber segment being provided with at least one Bragg grating.

10. Process in accordance with claim 1, wherein the hollow shaft is the drive shaft for a variable-pitch marine propeller.

11. Process in accordance with claim 10, wherein thrust transmitted by the shaft is determined from the ascertained axial deformation.

12. Device for dynamic measurement of the axial deformation of a rotating hollow shaft, comprising:

a fiber optic sensor with a glass fiber segment which is attached securely to a segment of an inside wall of a hollow shaft extending in axial alignment with the hollow shaft, an arrangement for injecting a light signal produced by a light source into the glass fiber segment, mounted in the hollow shaft, a detector mounted in the hollow shaft for detecting the light signal after passing through the glass fiber segment, and an evaluation unit for determining axial deformation of a glass fiber segment over a given period of time by determining axial deformation of the glass fiber segment due to the rotation of the hollow shaft and from a change of at least one parameter of the light signal when the light signal passes through the glass fiber segment;

wherein the evaluation unit is adapted for evaluating the time behavior of the ascertained axial deformation so as to detect vibrations of at least one of marine engine and cavitation noise transmitted into the shaft.

13. Device of claim 12, further comprising:

a telemetry unit mounted in the hollow shaft, wherein the evaluation unit includes means for communicating with the telemetry unit for receiving detected data, and the evaluation unit determines the axial deformation from the received detected data.

* * * * *